United States Patent Office 3,469,636
Patented Sept. 30, 1969

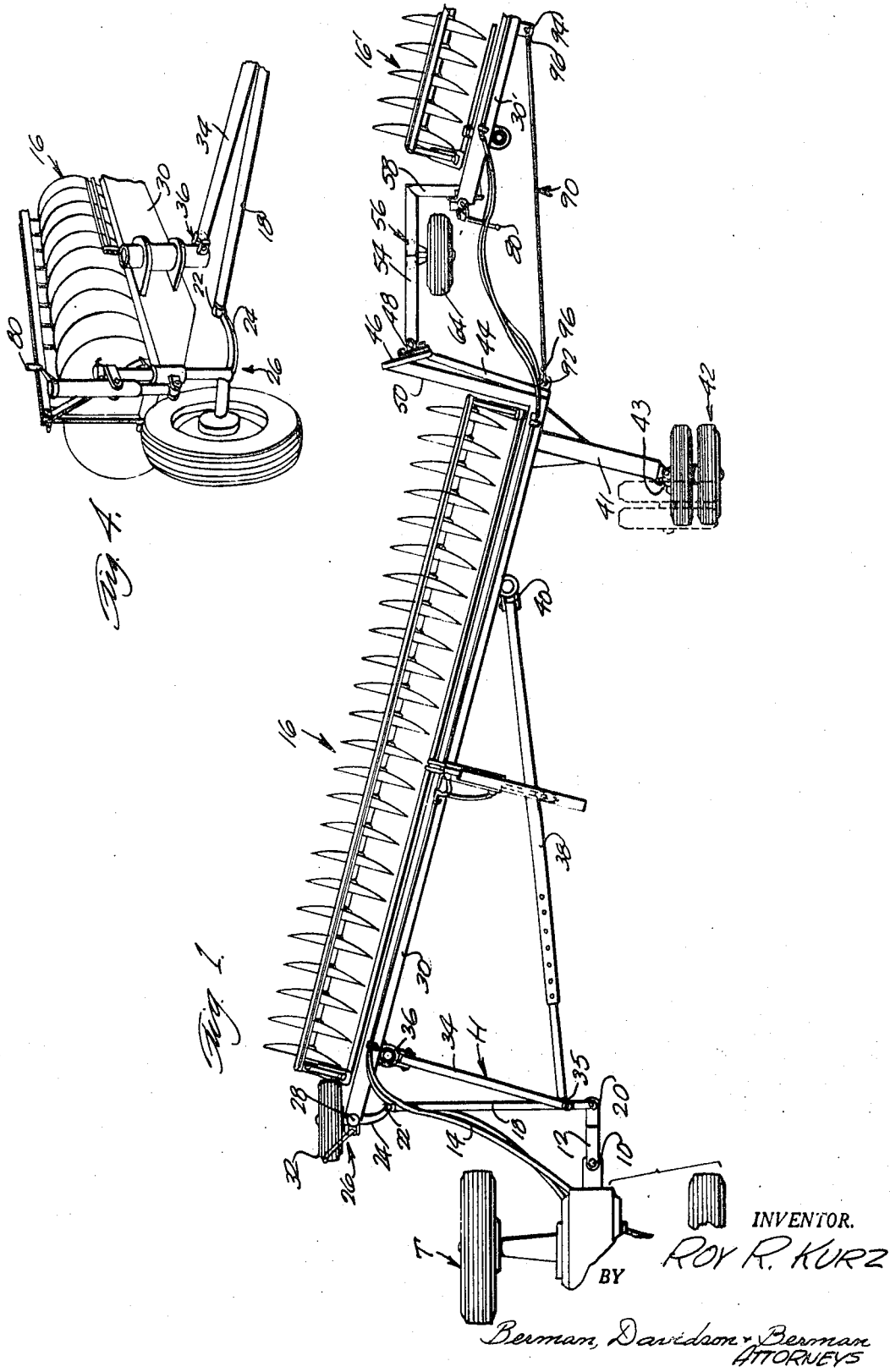

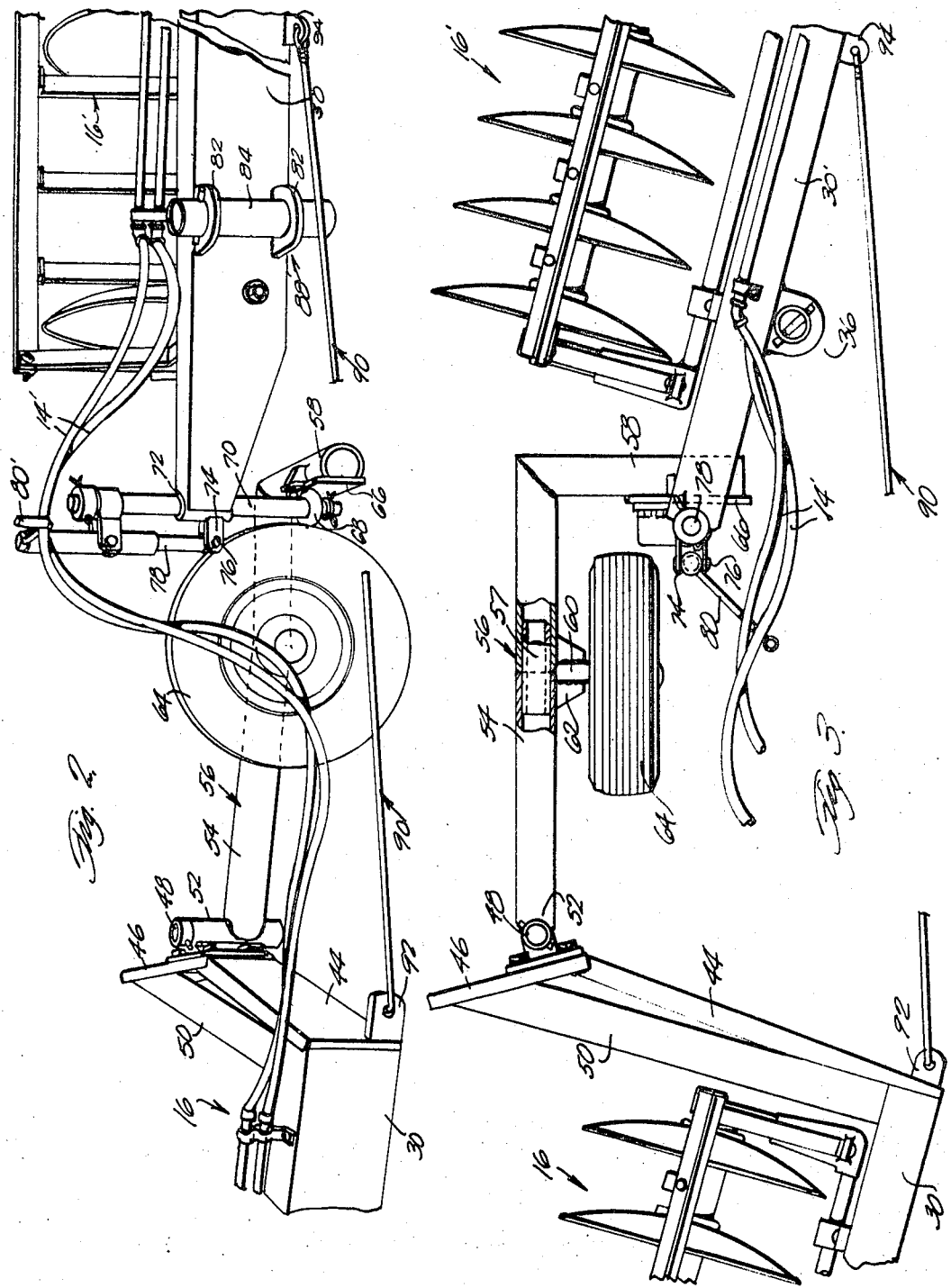

3,469,636
PLOW ASSEMBLY
Roy R. Kurz, Box 34, Rte. 1, Kendall, Kans. 67857
Filed Apr. 1, 1966, Ser. No. 539,539
Int. Cl. A01b 49/00; B62d 53/00
U.S. Cl. 172—314          7 Claims

ABSTRACT OF THE DISCLOSURE

A device for connecting consecutive gangs of a tandem arranged series of gang plows, said device comprising an L-shaped frame member; means at the free end of the longer leg for pivotal connection with a drawbar on a preceding gang; means on the shorter leg for pivotal connection to the plow beam of a subsequent gang, the axes of both pivotal connections being substantially vertical, and a land wheel mounted on an axle secured intermediate the extremities of the long leg and having a substantially horizontal axis.

---

This invention relates to tandem plows, and more particularly to a disc plow assembly involving a tractor-connected leading plow and one or more trailing plows of substantially conventional forms, and hitch means for connecting trailing plows to the leading plows.

The primary object of the invention is the provision of a simplified and more efficient and effective plow assembly of the kind indicated, wherein the front wheels of trailing plows are eliminated and trailing plows are supported at their forward ends, on wheeled couplings substituted for front wheels.

Another object of the invention is the provision, in an assembly of the character indicated above, of simplified coupling and cable means extending between adjacent plows, for pulling the plows forwardly and in properly angled relationships to each other, which means eliminates the complicated and expensive means generally in use for this purpose.

A further object of the invention is the provision of cable means of character indicated above, which are adapted to be easily disconnected to enable the trailing plows to line up behind an associated tractor, as when the assembly is to be towed along narrow roads.

In the drawings:

FIGURE 1 is a fragmentary top plan view, showing an assembly of the present invention, involving a tractor, a leading disc plow connected thereto, and a trailing disc plow connected to the leading plow;

FIGURE 2 is an enlarged fragmentary side elevation of FIGURE 1;

FIGURE 3 is a top plan view of FIGURE 2; and

FIGURE 4 is a fragmentary front end elevation of FIGURE 1.

Referring in detail to the drawings, a conventional form of tractor T is shown, on whose rear end is pivoted, as indicated at 10, the forward end of a longitudinal drawbar 12. Hydraulic control lines 14 for a leading disc plow 16 and a trailing disc plow 16', extend rearwardly from the tractor T.

A hitch H positions the leading plow 16 laterally outwardly with respect to the tractor T, with the plow 16 disposed at a rearward and laterally inward angle, relative to the path of forward travel of the tractor. The hitch H which connects the leading plow 16 to the tractor drawbar 12, can comprise, as shown in FIGURE 1, a transverse horizontal arm 18, extending laterally outwardly from the tractor drawbar 12, and pivoted, at its laterally inward end, as indicated at 20, to the rear end of the drawbar. The lateral arm 18 has pivoted, at its outer end, as indicated at 22, the inner end of a transverse steering arm 24, of a front wheel mount 26, which is journalled, as indicated at 28, on the forward end of a longitudinally elongated plow beam 30. The mount 26 carries a front ground engaging wheel 32.

A transverse link 34, disposed at a laterally outward and rearward angle, relative to the lateral arm 18, is pivoted, at its inner end, as indicated at 35, to the lateral arm 18, at a location spaced outwardly from the pivotal point 20. The link 34 is universally connected, as indicated at 36, at its outer end, to the plow beam 30, at a location spaced rearwardly from the wheel mount 26. A longitudinally extending and longitudinally adjustable tie rod 38, is pivoted, at its forward end, at the pivot 35, and is universally connected, at its rear end, as the strut being operatively connected to the hydraulic lines 14.

A fixed, laterally inwardly extending arm 41, on the plow beam 30, carries, at its inward end, a rotatable wheel unit 42, which is adapted to be positioned longitudinally, as indicated in full lines, in FIGURE 1, while the plow assembly is being towed, as along a road; and to be positioned at ninety degrees to this position, as indicated in phantom lines, in FIGURE 1, when the assembly is in plowing position, whereby the leading plow 16 is supported on the ground. This is accomplished by conventional mechanism 43.

Fixed to and extending laterally outwardly, at a substantially right angle relative thereto, is a fixed bar 44, to whose outer end is suitable fixed a plate 46 which is angled outwardly and forwardly relative to the bar 44, and carries, on its rear side, a vertical axis knuckle 48. A brace bar 50, in front of the bar 44 extends between and is fixed to the plow beam 30 and the plate 46. A sleeve 52 is journalled on the knuckle 48 and is suitably fixed to the forward end of the longitudinal horizontal arm 54, of an L-shaped coupling 56, having a laterally inwardly extending lateral arm 58, on its rear end, disposed at right angles to the longitudinal arm 54. A stub axle 60 is fixed, as indicated at 62, to and extends laterally inwardly from an intermediate point of the longitudinal arm 58, and has a ground-engaging wheel 64 journalled thereon. The coupling 56 is welded, end-to-end, to the rear end of the arm 54, as shown in FIGURE 3, with a telescoped sleeve 57 engaged in and disposed across the joint.

A vertical plate 66, suitably fixed to the forward side of the lateral coupling arm 58, carries a forwardly extending journal 68, through which is journalled the lower end of a perpendicular shaft 70. The intermediate part of the shaft 70 is journalled through a journal 72, fixed on the forward end of the plow beam 30' of the trailing disc plow 16'. A clevis 74 extends forwardly from the journal 72, in which is pivoted, as indicated at 76, the lower end of an upstanding hydraulic line carrier 78, having a lateral hook 80', on its upper end, over which the hydraulic lines 14', from a preceding plow, are trained, in an out-of-the-way position, and extend rearwardly along the trailing plow 16'.

The plow beam 30' of the trailing plow 16', has, on its laterally inward side, adjacent to its forward end, a pair of fixed vertically spaced areas 82, through which a vertical shaft 84 is supportably journalled, the resultant unit 88' being the same in construction as that to which the link 34 is connected on the leading plow 16. The assembly 88' is not involved in the assembly of the present invention, and the function of the strut 38, of the leading plow 16, is performed by a cable 90, which, at its forward end, is secured to a rearwardly extending ear 92, provided at the inner end of the bar 44, and its rear end, to an ear 94, fixed to the plow beam 30', of the trailing plow 16', at a location spaced behind the assembly 88', the connection of cable 90 being readily disconnectable, as by the employment of hooks 96, on the ends of the cable, engaged through the ears 92 and 94. The length of the cable 90 is such that, through the medium of the coupling 56, and the cable 90, the beam 30' of the trailing plow 16' is maintained parallel to the beam 30 of the leading plow 16, in plowing operations.

When towing the plow assembly, the cables 90 need never be disconnected, between adjacent trailing plows, as these plows swing into line behind each other, when being towed to locations.

It is thus possible to connect a series of plow units for overlapping parallel advance while in active condition and to come into alignment for highway towing.

What is claimed is:

1. A device for connecting consecutive gangs of a tandem arranged series of gang plows, said device comprising an L-shaped frame member; means at the free end of the longer leg for pivotal connection with a drawbar on a preceding gang; means on the shorter leg for pivotal connection to the plow beam of a subsequent gang, the axes of both pivotal connections being substantially vertical, and a land wheel mounted on an axle secured intermediate the extremities of the long leg and having a substantially horizontal axis.

2. The device of claim 1 in which said axle is directed inwardly of the L-shaped frame.

3. The device of claim 1, in which the means at the free end of the longer leg comprises a sleeve with its axis substantially normal to the axis of said leg, said sleeve being slidable over and rotatable on a pintle on the drawbar of a preceding gang.

4. The device according to claim 1, in which the means the shorter leg comprises a plate secured to such leg, said plate having an inwardly projecting journal secured thereto, said journal being adapted to mate with a pintle secured to the forward end of a following gang.

5. The device of claim 2, in which the means at the free end of the longer leg comprises a sleeve with its axis substantially normal to the axis of said leg, said sleeve being slidable over and rotatable on a pintle on the drawbar of a preceding gang.

6. The device of claim 2, in which the means on the shorter leg comprises a plate secured to such leg, said plate having an inwardly projecting journal secured thereto, said journal being adapted to mate with a pintle secured to the forward end of a following gang.

7. The device of claim 3, in which the means on the shorter leg comprises a plate secured to such leg, said plate having an inwardly projecting journal secured thereto, said journal being adapted to mate with a pintle secured to the forward end of a following gang.

References Cited

UNITED STATES PATENTS

| 1,054,885 | 3/1913 | Weiler | 172—314 X |
| 2,136,607 | 11/1938 | Benjamin | 172—599 |

FOREIGN PATENTS

| 16,261 | 7/1909 | Great Britain. |
| 92,816 | 2/1962 | Denmark. |

ROBERT E. PULFREY, Primary Examiner

JAMES W. PETERSON, Assistant Examiner

U.S. Cl. X.R.

280—411